(12) United States Patent
Anada et al.

(10) Patent No.: US 6,414,933 B1
(45) Date of Patent: Jul. 2, 2002

(54) MECHANISM FOR FEEDING A PICKUP CARRIAGE OF A RECORDING MEDIUM REPRODUCING DEVICE

(75) Inventors: Satoru Anada; Hideki Kinoshita; Jun Togashi; Takashi Ota; Kiyoshi Morikawa, all of Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/514,594

(22) Filed: Feb. 28, 2000

(30) Foreign Application Priority Data

Feb. 26, 1999 (JP) .............................. 11-051704

(51) Int. Cl.[7] .............................. G11B 5/55; G11B 21/08
(52) U.S. Cl. .............................................. 369/219
(58) Field of Search .............................. 369/219, 223, 369/244; 360/106

(56) References Cited

U.S. PATENT DOCUMENTS 5,812,347 A * 9/1998 Henke ....................... 360/106
5,889,638 A * 3/1999 Kabasawa et al. .......... 360/106
5,995,479 A * 11/1999 Takizawa ................... 369/219

FOREIGN PATENT DOCUMENTS

GB 2217094 A * 10/1989

* cited by examiner

*Primary Examiner*—William Korzuch
*Assistant Examiner*—Christopher R. Beacham
(74) *Attorney, Agent, or Firm*—Arent Fox Kintner Plotkin & Kahn

(57) ABSTRACT

A feeding screw is rotatably mounted on a chassis of a recording medium reproducing device. A half nut having a semicircular sectional shape is mounted on an optical pickup carriage. The half nut has at least one thread which comprises a thick central portion to be engaged with the feeding screw and thin both side portions not to be engaged with the feeding screw. The optical pickup carriage is fed by a rotation of the feeding screw, being engaged with the half nut.

3 Claims, 3 Drawing Sheets

MECHANISM FOR FEEDING A PICKUP CARRIAGE OF A RECORDING MEDIUM REPRODUCING DEVICE

BACKGROUND OF THE INVENTION

The present invention relates to a mechanism for feeding an optical pickup carriage of a recording medium reproducing device, and more particularly to a feeding screw mechanism for feeding an optical pickup carriage along guide shafts of a device for reproducing a recording medium such as a CD (compact disc).

In general, the reproducing device for reproducing a recording medium such as the CD is provided with a feeding screw mechanism for feeding the optical pickup carriage mounting the optical pickup for reproducing a recording medium along the guide shafts.

FIG. 4 is a plan view of a chassis 1 of a conventional reproducing device in which a disc clamp mechanism is omitted.

As shown in FIG. 4, a chassis 1 has a turntable 2 for centering and loading a recording medium, a feeding screw 4 rotated by a motor 3, and an optical pickup carriage 5 slidably mounted on a pair of guide shafts 6 extending in the radial direction of the recording medium loaded on the turntable 2, and having a full nut 5A engaged with the screw 4. An objective 7 is also mounted on the optical pickup carriage 5.

An end of the feeding screw 4 which is located on an outer periphery end of the loaded recording medium is engaged with an outer holder 8A securely mounted on the chassis 1.

Also, another end of the feeding screw 4 which is located on an inner periphery end of the loaded recording medium is engaged with an inner holder 8B which is slidably mounted on the chassis 1 in a direction of a shaft center of the feeding screw 4, and urged to the outer holder 8A by a torsion spring 9.

The motor 3 rotates the feeding screw 4 so that the nut 5A engaged with the screw 4 is moved on the feeding screw 4, thereby feeding the optical pickup carriage 5 along the guide shafts 6.

In the optical pickup carriage 5 employing the full nut 5A shown in FIG. 5a, the full nut 5A does not remove even if the reproducing device receives external shock. However, there may occur that the full nut 5A overruns either of ends of the feeding screw 4 and sticks in a non-threaded portion because of the inertia, so that the optical pickup carriage can not be moved.

In addition, since the engaging area between the full nut 5A and the feeding screw 4 is large, the accuracy of parts must be held above a predetermined level, which causes the manufacturing cost of the optical pickup carriage to increase.

In order to resolve such a problem, a half nut 5B shown in FIG. 5b has been proposed so as to prevent the nut from sticking in the non-threaded portion of the screw 4. The half nut SB is made of plastic for reducing the manufacturing cost and pivotally mounted on the optical pickup carriage 5, and further urged to the screw 4 by a coil spring 10. Thus, the half nut 5B is deflected from the non-threaded portion by compressing the coil spring so that the half nut does not stick in the portion, even if the half nut 5B is pushed out to either end of the feeding screw 4.

However, since the feeding screw 4 is urged by the torsion spring 9 to the outer holder 8A, it may occur that the feeding screw 4 and the optical pickup carriage 5 are moved to the inner holder 8B for an instant due to the external shock. In particular, since during the transportation of the reproducing device or the waiting state for the reproduction, the optical pickup carriage is positioned at an innermost position, the optical pickup carriage 5 severely bumps the inner holder 8B, causing the objective 7 to incline.

SUMMARY OF THE INVENTION

An object of the present invention is to provide a reliable and optimum mechanism for feeding an optical pickup carriage of a reproducing device.

According to the present invention, there is provided a mechanism for feeding an optical pickup carriage of a recording medium reproducing device having a chassis comprising, a feeding screw rotatably mounted on the chassis by holders provided at both ends of the feeding screw, the feeding screw being disposed in a radial direction of the recording medium loaded on the reproducing device, a half nut having a semicircular sectional shape, and mounted on the optical pickup carriage, the half nut having at least one thread which comprises a thick central portion engaged with the feeding screw and thin both side portions.

The holder provided at an outer end of the feeding screw is slidably provided on the chassis so as to be moved in the axial direction of the feeding screw, and urged by a spring to the feeding screw.

These and other objects and features of the present invention will become more apparent from the following detailed description with reference to the accompanying drawings.

DETAILED DESCRIPTION OF THE PREFERRED EMBODIMENT

Figure 3A:
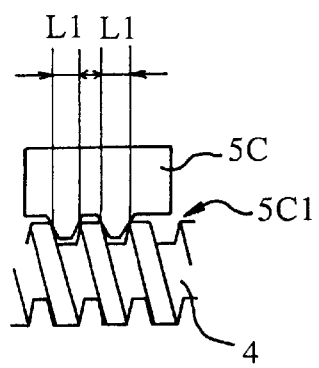
FIG. 3a is a sectional view at a central portion of the half nut engaged with a feeding screw.
Figure 3B:
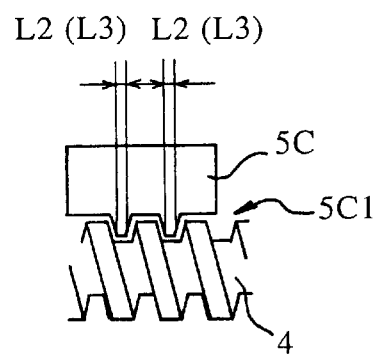
FIG. 3b is a sectional view of the both end portions of the half nut engaged with the feeding screw.
Figure 4:
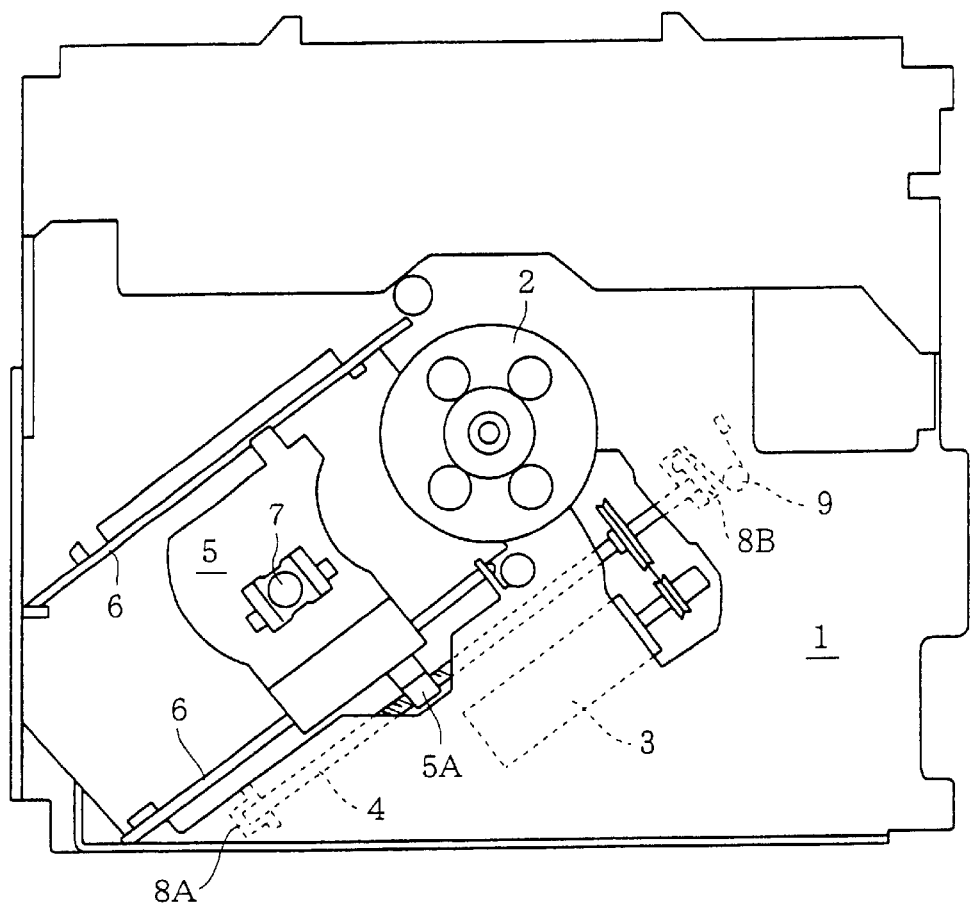
FIG. 4 is a plan view of a conventional reproducing device in which a cramp mechanism is removed.
Figure 5:
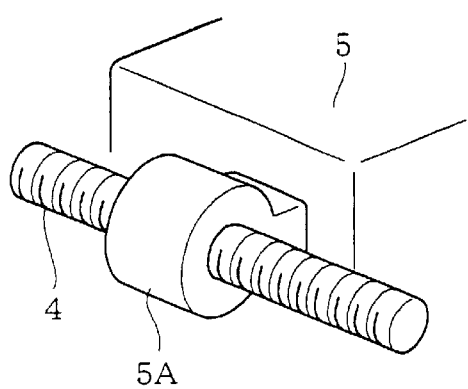
FIGS. 5a and 5b are perspective views showing conventional full nut and half nut.
Figure 5:
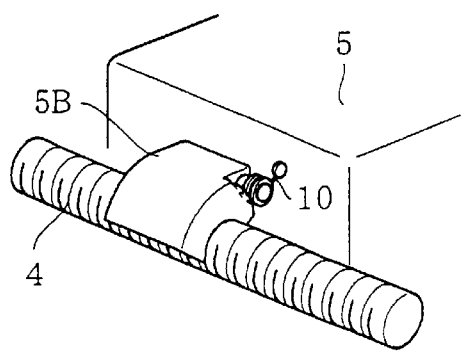

An embodiment of the present invention is described hereinafter with reference to FIGS. 1 to 3b, in which the same part as FIG. 4 is identified with the same reference numeral as FIG. 4.

Figure 1:
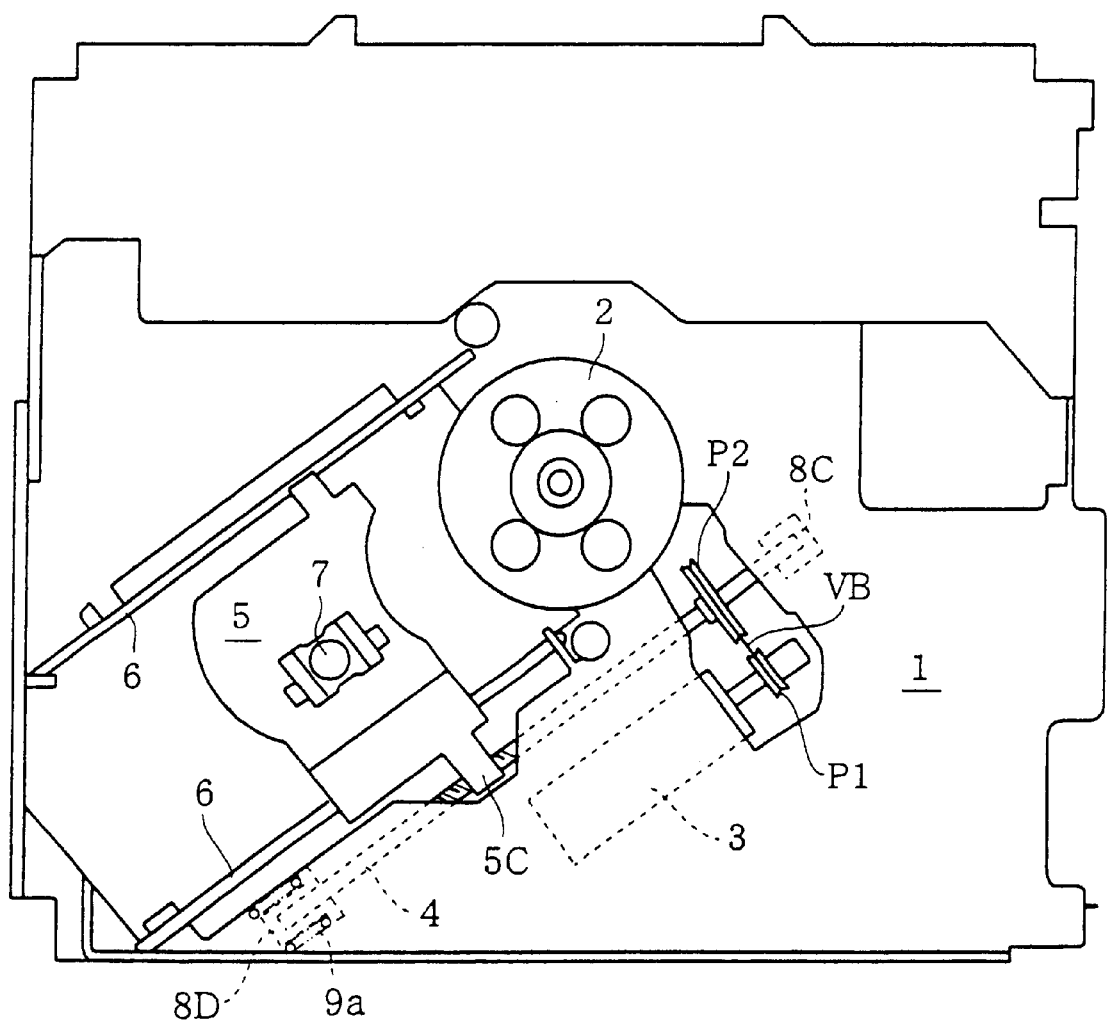
FIG. 1 is a plan view showing a chassis of a reproducing device in which a cramp mechanism is removed.

Referring to FIG. 1 which is a similar plan view to FIG. 4, at a central portion of the chassis 1 of the reproducing device, the turntable 2 is provided for centering a recording medium loaded inside the reproducing device, and to be rotated by a motor (not shown) coaxial with the turntable 2.

The motor 3 and the feeding screw 4 rotated around a shaft center thereof by the motor 3 are provided adjacent the turntable 2 on the chassis 1.

More particularly, a pulley P1 is securely mounted on a driving shaft of the motor 3, and a pulley P2 is secured to the feeding screw 4. A V belt VB is engaged with the pulleys P1 and P2 so as to rotate the feeding screw 4 through transmitting a driving force of the motor 3 from the pulley P1 to the pulleys P2 via the V belt VB.

The feeding screw 4 has a screw portion with a right-hand screw on a Shaft periphery surface and provided in the chassis 1 in the same direction as radius of the recording medium loaded inside the reproducing device. An inner end of the feeding screw 4 which is positioned at an innermost end side of the loaded recording medium is rotatably supported by an inner holder 8C which is secured to the chassis 1, and an outer end of the screw 4 which is positioned at an outermost end side of the loaded recording medium is rotatably mounted in an outer holder 8D. The outer holder 8D is axially slidably mounted in the chassis 1 so as to be moved in the axial direction of the feeding screw 4, and urged by a coil spring 9a toward the inner holder 8C.

A half nut 5C made by plastic molding is provided on the optical pickup carriage 5 and rotatably mounted on a shaft (not shown) parallel with the guide shaft 6 and urged by a spring (not shown) to be engaged with the feeding screw 4. The carriage 5 is provided on the chassis 1 so as to be reciprocated along the shafts 6 parallel with the screw 4 by the movement of the half nut 5C engaged with the screw 4. The objective 7 is mounted on the optical pickup carriage 5 at a central portion thereof.

Figure 2:
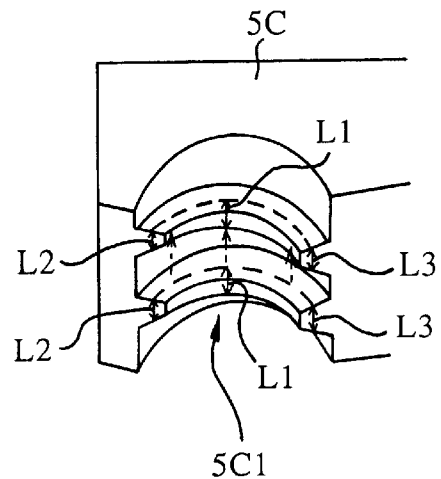
FIG. 2 is a perspective view of a half nut according to the present invention.

As shown in FIG. 2, the half nut 5C has a groove with a semicircular sectional shape which is formed by half cutting a full nut, and a pair of threads 5C1 formed on the arcuated concave surface of the groove for inserting the feeding screw 4. The thickness of the thread 5C1 is different at a central portion and at both end portions, respectively. Namely, the thickness L1 of a central portion of the thread 5C1 is set to be larger than thicknesses L2 and L3 at both end portions of the thread, thereby forming arcuated side surfaces.

Furthermore, as shown in FIG. 3a, the side surfaces of the central portion of the thread 5C1 have a thickness L1 so as to engage with sides of threads of the screw 4. The thicknesses L2 and L3 of the both end portions of the thread is formed to be slightly thinner than the thickness L1 of the central portion, so that there is formed a gap between both ends having thickness L2, L3 and the thread of the screw 4, as shown in FIG. 3b.

In the optical pickup carriage 5 having these compositions, when the pulley P1 is rotated by the motor 3, the V belt VB and pulley P2 are accordingly operated to rotate the feeding screw 4. Thus, the optical pickup carriage 5 is reciprocated along the guide shafts 6 with the half nut 5C engaged with the feeding screw 4. In that operation, only the central portion of each thread 5C1 of the half nut 5C, having the large thickness L1, engages with the threads of the feeding screw 4, and the both end portions of the thread do not engage with the thread of the feeding screw 4.

The operation of the feeding mechanism for the optical pickup carriage will be described hereinafter.

In the waiting condition, the optical pickup carriage 5 is positioned at an innermost position of a disc to be loaded on the turntable 2. Even when the reproducing device gets the external shock, the feeding screw 4 does not move in the inner direction since the inner holder 8C is secured on the chassis 1. Although the feeding screw 4 is slightly moved in the outer direction together with the outer holder 8D, comprising the spring 9a. the optical pickup carriage 5 does not collide with the outer holder 8D since the optical pickup carriage 5 is positioned at the innermost position. Thus, the objective 7 is prevented from inclining even if the reproducing device receives the external shock.

When a recording medium is inserted in the reproducing device by a user, a control section (not shown) operates so that the recording medium is automatically centered and loaded on the turntable 2 by a carrier mechanism (not shown). In accordance with an instruction of the user, the motor 3 is operated to rotate the feeding screw 4 in the counterclockwise direction as viewed from the right side in FIG. 1, and the puly P1 is also rotated in the counterclockwise direction and the puly P2 is operated through the V belt VB. Thus, the optical pickup carriage 5 is fed from the inner side to the outer side of the disc, with the half nut 5C engaged with the rotating feed screw 4 along the guide shafts 6 parallel with the screw 4, and the reproduction of the recording medium starts.

During the feeding of the optical pickup carriage 5, only the central portions of the threads 5C1 of the half nut 5C engage with the thread of the feeding screw 4, and both end portions having thinner thicknesses L2, L3 than the thickness L1 of the central portions do not engage with the screw 4.

Since the contact area of the thread 5C1 with the feeding screw 4 is small because the thread 5C contacts with screw in point contact, the accuracy of the central portion only is required, and the accuracy of other portions is not highly required. Thus, the manufacturing cost of the nut can be reduced. In addition, the half nut can be made of plastic at a low cost, keeping the accuracy.

When the reproducing device receives the external shock, the thin portions of both sides of the thread 5C1 contact with the thread of the feeding screw 4, thereby preventing the half nut 5C from deviating from the feeding screw 4.

When the reproduction of the recording medium ends, the recording medium is discharged from the reproducing device by the control section, and the feeding screw 4 is rotated in the clockwise direction so that the optical pickup carriage 5 is returned from the outer side to the innermost waiting position.

Although the operation of the optical pickup carriage feeding mechanism for reproducing the recording medium fed in the reproducing device is described and the half nut 5C has two threads, one or more threads can be formed in the half nut.

In accordance with the present invention, the mechanism for feeding an optical pickup carriage of the present invention includes a half nut provided on the optical pickup carriage and a feeding screw with which the half nut engages, and further the optical pickup carriage is fed by rotating the feeding screw, the thickness of the thread of ends of the half nut is thinner than the thickness of a central portion, and thickness of the central portion of the thread is a thickness so as to be contacted with the thread of the feeding screw, and the thickness of the ends of the thread is a thickness so as not to be contacted with the thread of the feeding screw. Therefore, the thin portion of the thread of the half nut contact with the thread of the feeding screw when the reproducing device receives an external shock. Therefore, the optical pickup carriage is prevented from deviating from the feeding screw.

Thus, it is possible to provide a reproducing device resistant to external shock and having high reliability.

While the invention has been described in conjunction with preferred specific embodiment thereof, it will be understood that this description is intended to illustrate and not limit the scope of the invention, which is defined by the following claims.

What is claimed is:

1. A mechanism for feeding an optical pickup carriage, comprising:

a half nut provided on the optical pickup carriage; and a feeding screw with which the half nut engages, wherein the optical pickup carriage is fed by a rotation of the feeding screw, and the thickness of the thread of ends in a circumferential direction of the half nut is thinner than the thickness of the thread of a central portion in the circumferential direction thereof.

2. The mechanism according to claim 1, wherein the thickness of the central portion of the thread is a thickness so as to be contacted with the thread of the feeding screw, and the thickness of the ends of the thread is a thickness so as not to be contacted with the thread of the feeding screw.

3. The mechanism according to claim 1, wherein the half nut is made of plastic.

* * * * *